US008822363B2

(12) United States Patent
Levin et al.

(10) Patent No.: US 8,822,363 B2
(45) Date of Patent: Sep. 2, 2014

(54) CATALYST REGENERATION PROCESS

(75) Inventors: Doron Levin, Highland Park, NJ (US);
James Harding Beech, Jr., Kingwood, TX (US); Selma SheungNam Lawrence, Houston, TX (US); Julia Elizabeth Steinheider, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 426 days.

(21) Appl. No.: 12/738,057

(22) PCT Filed: Nov. 4, 2008

(86) PCT No.: PCT/US2008/082352
§ 371 (c)(1),
(2), (4) Date: Aug. 5, 2010

(87) PCT Pub. No.: WO2009/067331
PCT Pub. Date: May 28, 2009

(65) Prior Publication Data
US 2010/0298117 A1  Nov. 25, 2010

Related U.S. Application Data

(60) Provisional application No. 60/988,653, filed on Nov. 16, 2007.

(51) Int. Cl.
*B01J 38/12* (2006.01)
*B01J 38/40* (2006.01)
*B01J 38/30* (2006.01)
*B01J 38/36* (2006.01)
*B01J 38/34* (2006.01)
*B01J 38/16* (2006.01)
*B01J 29/70* (2006.01)
*B01J 29/06* (2006.01)
*B01J 38/20* (2006.01)
*B01J 29/90* (2006.01)
*B01J 29/74* (2006.01)
*B01J 29/78* (2006.01)

(52) U.S. Cl.
CPC .............. *B01J 29/90* (2013.01); *B01J 29/7034* (2013.01); *B01J 29/06* (2013.01); *B01J 38/20* (2013.01); *B01J 29/74* (2013.01); *B01J 2229/42* (2013.01); *B01J 29/78* (2013.01)
USPC ................... 502/49; 502/38; 502/39; 502/41; 502/42; 502/43; 502/51

(58) Field of Classification Search
USPC .................................................... 502/20–56
See application file for complete search history.

(56) References Cited

U.S. PATENT DOCUMENTS

| | | |
|---|---|---|
| 4,139,433 A | 2/1979 | Ward |
| 4,300,014 A | 11/1981 | Yamasaki et al. |
| 4,417,975 A | 11/1983 | Myers et al. |
| 4,439,409 A | 3/1984 | Puppe et al. |
| 4,463,209 A | 7/1984 | Kursewicz et al. |
| 4,550,009 A | 10/1985 | Burkel |
| 4,584,090 A | 4/1986 | Farnsworth |
| 4,721,806 A | 1/1988 | Zinnen |
| 4,721,807 A | 1/1988 | Zinnen |
| 4,780,195 A * | 10/1988 | Miller ..................... 208/120.1 |
| 4,826,667 A | 5/1989 | Zones et al. |
| 4,954,325 A | 9/1990 | Rubin et al. |
| 4,975,399 A | 12/1990 | Gardner |
| 4,977,119 A * | 12/1990 | Koves ............................ 502/48 |
| 5,087,783 A | 2/1992 | Johnson et al. |
| 5,093,293 A | 3/1992 | Laukonen |
| 5,098,684 A | 3/1992 | Kresge et al. |
| 5,198,203 A | 3/1993 | Kresge et al. |
| 5,236,575 A | 8/1993 | Bennett et al. |
| 5,246,689 A | 9/1993 | Beck et al. |
| 5,250,277 A | 10/1993 | Kresge et al. |

(Continued)

FOREIGN PATENT DOCUMENTS

| | | | |
|---|---|---|---|
| DE | 36 25 693 | 2/1988 | |
| EP | 92065 A1 * | 10/1983 | ............. C10G 11/14 |

(Continued)

OTHER PUBLICATIONS

"Periodic table of the elements," Chemical and Engineering News, vol. 63, Issue (5), p. 27 (1985).

(Continued)

*Primary Examiner* — Jennifer A Smith
(74) *Attorney, Agent, or Firm* — Darryl M. Tyus

(57) ABSTRACT

This disclosure relates to a process for regenerating a catalyst composition, wherein the catalyst composition comprising a molecular sieve and at least 10 wt. % coke having a C/H molar ratio in the range of 0.26 to 5, the process comprising (a) contacting the catalyst composition with a first oxidative medium having oxygen and water at first conditions sufficient to form a first regenerated catalyst composition having at least 50 wt. % less coke than the catalyst composition; and then (b) contacting at least a portion of the first regenerated catalyst composition with a second oxidative medium having oxygen, and optionally water, at second conditions sufficient to form a second regenerated catalyst composition having at least 50 wt % less coke than the first regenerated catalyst composition, wherein the catalyst composition in step (a) and the first regenerated catalyst in step (b) have contacted total amount of water in the range of 1 to 50 weight water per weight of the second regenerated catalyst composition.

15 Claims, No Drawings

(56) References Cited

U.S. PATENT DOCUMENTS

| | | | |
|---|---|---|---|
| 5,362,697 | A | 11/1994 | Fung et al. |
| 5,712,214 | A | 1/1998 | Huang et al. |
| 6,077,498 | A | 6/2000 | Diaz Cabañas et al. |
| 6,245,703 | B1 | 6/2001 | Kuechler et al. |
| 6,756,030 | B1 | 6/2004 | Rohde et al. |
| 6,936,744 | B1 | 8/2005 | Cheng et al. |
| 2002/0115555 | A1* | 8/2002 | van den Berge et al. ....... 502/61 |
| 2003/0104926 | A1* | 6/2003 | Eijsbouts et al. ............... 502/29 |
| 2006/0217581 | A1 | 9/2006 | Xu et al. |
| 2007/0142212 | A1 | 6/2007 | Pujado |
| 2007/0161835 | A1 | 7/2007 | Butler et al. |
| 2008/0027256 | A1 | 1/2008 | Roth et al. |
| 2008/0027259 | A1 | 1/2008 | Roth et al. |
| 2008/0027260 | A1 | 1/2008 | Lai et al. |
| 2008/0045768 | A1 | 2/2008 | Roth et al. |
| 2010/0298117 | A1* | 11/2010 | Levin et al. ..................... 502/23 |

FOREIGN PATENT DOCUMENTS

| | | |
|---|---|---|
| EP | 0 036 704 | 7/1984 |
| EP | 0 293 032 | 11/1988 |
| WO | 89/10342 | 11/1989 |
| WO | WO 97/17290 | 5/1997 |
| WO | WO 2005/118476 | 12/2005 |
| WO | WO 2006/015824 | 2/2006 |
| WO | WO 2006/015825 | 2/2006 |
| WO | WO 2006/015826 | 2/2006 |

OTHER PUBLICATIONS

Beck, et al., "A New Family of Mesoporous Molecular Sieves Prepared with Liquid Crystal Templates," Journal of the American Chemical Society, vol. 37, Issue 27 (1992), pp. 10834-10843.

Baerlocher et al., "Atlas of Zeolite Framework Types," 5$^{th}$ Revised Ed., Structure Commission of the International Zeolite Association by Elsevier, New York 2001, pp. 202-203.

* cited by examiner

CATALYST REGENERATION PROCESS

CROSS-REFERENCE TO RELATED APPLICATIONS

This application is a national stage filing of International Patent Cooperation Treaty Application No. PCT/US2008/082352 filed Nov. 4, 2008, which claims the benefit of and priority to USSN 60/988,653 filed Nov. 16, 2007, the disclosure of which is fully incorporated herein by reference.

FIELD

The disclosure relates to a catalyst regeneration process by contacting a coked hydrocarbon conversion process catalyst in two steps in the presence of controlled amount of oxygen and controlled amount of water.

BACKGROUND

Molecular sieves, especially, zeolites, have been used in a number of commercial processes. For examples, the production of xylenes via transalkylation of $C_9+$ aromatics with $C_6$-$C_7$ aromatics to produce xylenes uses a zeolite based catalyst comprising at least one of Mordenite, ZSM-12, MCM-22 family material, and any combination thereof. Typically molecular sieves lose performance, such as activity, selectivity, and capacity, through various deactivation mechanisms. As the molecular sieve catalyst or adsorbent ages with increasing time on stream, more severe conditions, such as, higher temperature and/or low through-put, are normally required to maintain comparable activity and/or selectivity. When the maximum reactor temperature is reached, the molecular sieve catalyst or adsorbent needs to be replaced or regenerated. The spent catalyst, at the end of its useful life, may contain a significant amount of coke, often exceeding 35 wt. %, and sometimes even as high as 50 wt. %. The coke deposit may be graphitic in nature, characterized by having a low H/C ratio, and is often difficult to remove during regeneration under standard regeneration conditions. One common regeneration technique is to burn the coke from the molecular sieve in an oxidative environment, such as air or oxygen. However, the oxidative calcination process normally needs to be controlled with dry air to prevent steam damage to the molecular sieve framework, for example, steam dealumination of zeolite, which causes severe damage to the molecular sieve. Another less common regeneration technique is to rejuvenate a spent catalyst in a reductive environment, such as hydrogen. However, if the catalyst is not regenerated properly, aging rates during the second cycle can be very high resulting in a second cycle length as short as less than 10% of the first cycle length.

Other regeneration techniques include the use of steam or other solutions in combination with heating or calcining. For example, U.S. Pat. No. 5,093,293 discloses the use of steam for removing coke and other contaminants from Zeolite L. U.S. Pat. No. 4,139,433 discloses that a hydrocracking catalyst containing a Group VIII metal is regenerated by treating the spent catalyst with an ammonium hydroxide solution followed by calcination at 500° F. to 950° F. It is stated that the process redistributes the Group VIII metals and removes mono and divalent metal cations.

U.S. Pat. No. 4,975,399 discloses a two-step heating process to remove carbonaceous deposits from a hydrotreating catalyst. U.S. Pat. No. 4,550,009 discloses treating a spent catalyst with a source of alkali or alkaline earth metal cations or ammonia and then extracting extractable nitrogen compounds with a liquid organic solvent.

We have surprisingly discovered that the controlled addition of water during the regeneration, combined with a staged controlled temperature burn, can successfully regenerate a heavily coked catalyst with minimal steam damage of the molecular sieve structure. In fact, the aging rate of the regenerated catalyst decreases with increased water exposure during regeneration. The benefit of water addition was unexpected and contrary to its effect during regeneration of other zeolitic catalyst systems where hydrothermal deactivation is increased with water addition. In addition, we have discovered that the rate of coke removal increases with increasing water partial pressure, thereby shortening the required regeneration time.

SUMMARY

In some embodiments, this disclosure relates to a process for regenerating a catalyst composition, wherein the catalyst composition comprises a molecular sieve and at least 10 wt.% coke having a C/H molar ratio in the range of 0.26 to 5, the process comprising:
  a. contacting the catalyst composition with a first oxidative medium having oxygen and water at first conditions sufficient to form a first regenerated catalyst composition having at least 50 wt. % less coke than the catalyst composition; and then
  b. contacting at least a portion of the first regenerated catalyst composition with a second oxidative medium having oxygen, and optionally water at second conditions sufficient to form a second regenerated catalyst composition having at least 50 wt. % less coke than the first regenerated catalyst composition, wherein the catalyst composition in step (a) and the first regenerated catalyst composition in step (b) have contacted a total amount of water in the range of 1 to 50, alternatively in the range of 5 to 40, weight water per weight of the second regenerated catalyst composition.

In some aspects of this disclosure, the molecular sieve comprises at least one of a M41S family molecular sieve, a MCM-22 family molecular sieve, ETS-10, ETAS-10, ETGS-10, and a molecular sieve having a zeolite framework type comprising at least one of ABW, AET, AFG, AFI, AFX, ANA, AST, ASV, BCT, *BEA, BEC, BIK, BOG, BPH, BRE, CAN, CAS, CDO, CFI, CGS, CHA, -CHI, CON, DAC, DDR, DFT, DOH, DON, EAB, EDI, EMT, EON, EPI, ERI, ESV, ETR, EUO, EZT, FAR, FAU, FER, FRA, GIS, GIU, GME, GON, GOO, HEU, IFR, IHW, IMF, ISV, ITE, ITH, ITW, IWR, IWV, IWW, JBW, KFI, LAU, LEV, LIO, -LIT, LOS, LOV, LTA, LTL, LTN, MAR, MAZ, MEI, MEL, MEP, MER, MFI, MFS, MON, MOR, MOZ, MSE, MSO, MTF, MTN, MTT, MTW, MWW, NAB, NAT, NES, NON, NPO, NSI, OBW, OFF, OSO, OWE, -PAR, PAU, PHI, PON, RHO, -RON, RRO, RSN, RTE, RTH, RUT, RWR, RWY, SFE, SFF, SFG, SFH, SFN, SFO, SGT, SIV, SOD, SOS, SSY, STF, STI, STT, SZR, TER, THO, TOL, TON, TSC, TUN, UEI, UFI, UOZ, USI, UTL, VET, VNI, VSV, -WEN, and YUG.

In other aspects, the coke has a C/H molar ratio in the range of 0.5 to 1.5 and wherein the catalyst composition in step (a) and the first regenerated catalyst composition in step (b) have contacted total amount of water in the range of 1 to 10 weight water per weight of the second regenerated catalyst composition.

In yet other aspects, the coke has a C/H molar ratio in the range of 1.5 to 3.3 and wherein the catalyst composition in step (a) and the first regenerated catalyst composition in step (b) have contacted total amount of water in the range of 10 to 50 weight water per weight of the second regenerated catalyst composition.

In a preferred embodiment, the catalyst composition comprises 20-50 wt. % coke and the catalyst composition comprises at least 50 wt. % of a molecular sieve having a zeolite structure type of MTW based on the total weight of the catalyst composition without coke.

In another preferred embodiment, the catalyst composition comprises 0.01 to 10 wt. % of at least one of a metal element of Groups 6-10, preferably at least one of Pt, Pd, Ir, and Re, based on the total weight of the catalyst composition without coke.

In some embodiments, the first conditions comprise a temperature in the range of 250° C. to 425° C., a pressure in the range of 100 to 2070 kPa-a, a gas flowrate in the range of 0.1 to 10 Nm$^3$/hr/kg catalyst composition, and a water partial pressure in the range of 7 to 207 kPa-a. Preferably, the first conditions further comprise a regeneration time sufficient to reduce the amount of the coke on the catalyst composition by at least 80 wt. %.

In other embodiments, the second conditions comprise a temperature in the range of 350° C. to 500° C., a pressure in the range of 100 to 2070 kPa-a, a gas flowrate in the range of 0.1 to 10 Nm$^3$/hr/kg catalyst composition, and a water partial pressure in the range of 3 to 35 kPa-a. Preferably, the second conditions further comprise a regeneration time sufficient to reduce the amount of the coke on the first regenerated catalyst composition by at least 80 wt. %.

In other embodiments, the second regenerated catalyst composition has a transalkylation activity in the range of 70% to 120% of corresponding fresh catalyst composition, wherein the transalkylation activity is measured by determining the conversion of $C_9$ and $C_{10}$ aromatic hydrocarbons under transalkylating conditions with $C_6$ and $C_7$ aromatic hydrocarbons, where the transalkylating conditions include a temperature in the range of 375° C. to 500° C., pressure in the range of 1500 kPa-a to 3500 kPa-a, WHSV in the range of 2 to 20 and a $H_2$:HC ratio in the range of 1 to 10.

In other embodiments, the second regenerated catalyst composition has a transalkylation aging rate in the range of 60% to 110% of corresponding fresh catalyst composition, wherein the transalkylation aging rate is measured by determining rate of change of temperature required to maintain constant conversion of $C_9$ and $C_{10}$ aromatic hydrocarbons under transalkylating conditions with $C_6$ and $C_7$ aromatic hydrocarbons, where the transalkylating conditions include a temperature in the range of 375° C. to 475° C., pressure in the range of 2000 kPa-a to 3000 kPa-a, WHSV in the range of 2 to 10 and a $H_2$:HC ratio in the range of 1 to 8.

In an embodiment, this disclosure relates to a catalyst composition made by the regeneration process of this disclosure.

DETAILED DESCRIPTION OF THE EMBODIMENTS

As used in this specification, the term "framework type" is used in the sense described in the "Atlas of Zeolite Framework Types," 2001.

As used herein, the numbering scheme for the Periodic Table Groups is used as in Chemical and Engineering News, 63(5), 27 (1985).

The term "wppm" as used herein is defined as parts per million by weight.

The term "aromatic" as used herein is to be understood in accordance with its art-recognized scope which includes alkyl substituted and unsubstituted mono- and polynuclear compounds. The term "non-aromatic" or "non-aromatics" as used herein means hydrocarbon or hydrocarbons containing no aromatic ring.

The M41S family mesoporous molecular sieve is described in J. Amer. Chem. Soc., 1992, 114, 10834. Members of the M41S family mesoporous molecular sieve include MCM-41, MCM-48 and MCM-50. A member of this class is MCM-41 whose preparation is described in U.S. Pat. No. 5,098,684. MCM-41 is characterized by having a hexagonal structure with a unidimensional arrangement of pores having a cell diameter greater than 13 Angstroms. The physical structure of MCM-41 is like a bundle of straws wherein the opening of the straws (the cell diameters of the pores) ranges from 13 to 200 Angstroms. MCM-48 has a cubic symmetry and is described for example in U.S. Pat. No. 5,198,203. MCM-50 has a layered or lamellar structure and is described in U.S. Pat. No. 5,246,689.

The term "MCM-22 family material" (or "material of the MCM-22 family" or "molecular sieve of the MCM-22 family"), as used herein, includes one or more of:

(i) molecular sieves made from a common first degree crystalline building block unit cell, which unit cell has the MWW framework topology. (A unit cell is a spatial arrangement of atoms which if tiled in three-dimensional space describes the crystal structure. Such crystal structures are discussed in the "Atlas of Zeolite Framework Types", Fifth edition, 2001);

(ii) molecular sieves made from a common second degree building block, being a 2-dimensional tiling of such MWW framework topology unit cells, forming a monolayer of one unit cell thickness, preferably one c-unit cell thickness;

(iii) molecular sieves made from common second degree building blocks, being layers of one or more than one unit cell thickness, wherein the layer of more than one unit cell thickness is made from stacking, packing, or binding at least two monolayers of one unit cell thickness. The stacking of such second degree building blocks can be in a regular fashion, an irregular fashion, a random fashion, or any combination thereof; and (iv) molecular sieves made by any regular or random 2-dimensional or 3-dimensional combination of unit cells having the MWW framework topology.

The MCM-22 family materials are characterized by having an X-ray diffraction pattern including d-spacing maxima at 12.4±0.25, 3.57±0.07 and 3.42±0.07 Angstroms (either calcined or as-synthesized). The MCM-22 family materials may also be characterized by having an X-ray diffraction pattern including d-spacing maxima at 12.4±0.25, 6.9±0.15, 3.57±0.07 and 3.42±0.07 Angstroms (either calcined or as-synthesized). The X-ray diffraction data used to characterize the molecular sieve are obtained by standard techniques using the K-alpha doublet of copper as the incident radiation and a diffractometer equipped with a scintillation counter and associated computer as the collection system. Materials belong to the MCM-22 family include MCM-22 (described in U.S. Pat. No. 4,954,325 and U.S. patent application Ser. No. 11/823,722), PSH-3 (described in U.S. Pat. No. 4,439,409), SSZ-25 (described in U.S. Pat. No. 4,826,667), ERB-1 (described in European Patent No. 0293032), ITQ-1 (described in U.S. Pat. No. 6,077,498), ITQ-2 (described in International Patent Publication No. WO97/17290), ITQ-30 (described in International Patent Publication No. WO2005118476), MCM-36 (described in U.S. Pat. No. 5,250,277), MCM-49 (described in U.S. Pat. No. 5,236,575), UZM-8 (described in U.S. Pat. No. 6,756,030), MCM-56 (described in U.S. Pat. No. 5,362,697), EMM-10-P (described in U.S. patent application Ser.

No. 11/823,129), and EMM-10 (described in U.S. patent application Ser. Nos. 11/824,742 and 11/827,953).

It is to be appreciated the MCM-22 family molecular sieves described above are distinguished from conventional large pore zeolite alkylation catalysts, such as mordenite, in that the MCM-22 materials have 12-ring surface pockets which do not communicate with the 10-ring internal pore system of the molecular sieve.

The zeolitic materials designated by the IZA-SC as being of the MWW topology are multi-layered materials which have two pore systems arising from the presence of both 10 and 12 membered rings. The Atlas of Zeolite Framework Types classes five differently named materials as having this same topology: MCM-22, ERB-1, ITQ-1, PSH-3, and SSZ-25.

The MCM-22 family molecular sieves have been found to be useful in a variety of hydrocarbon conversion processes. Examples of MCM-22 family molecular sieve are MCM-22, MCM-49, MCM-56, ITQ-1, PSH-3, SSZ-25, and ERB-1. Such molecular sieves are useful for alkylation of aromatic compounds. For example, U.S. Pat. No. 6,936,744 discloses a process for producing a monoalkylated aromatic compound, particularly cumene, comprising the step of contacting a polyalkylated aromatic compound with an alkylatable aromatic compound under at least partial liquid phase conditions and in the presence of a transalkylation catalyst to produce the monoalkylated aromatic compound, wherein the transalkylation catalyst comprises a mixture of at least two different crystalline molecular sieves, wherein each of said molecular sieves is selected from zeolite beta, zeolite Y, mordenite and a material having an X-ray diffraction pattern including d-spacing maxima at 12.4±0.25, 6.9±0.15, 3.57±0.07 and 3.42±0.07 Angstrom (Å).

The MCM-22 family molecular sieves including MCM-22, MCM-49, and MCM-56 have various applications in hydrocarbon conversion processes. Unfortunately, industrial applications of zeolite catalysts have been hindered due to some major disadvantages associated with the current synthesis techniques that make large scale production of these catalysts complicated and therefore expensive. At present, crystalline zeolite catalysts are synthesized mainly by conventional liquid-phase hydrothermal treatment, including in-situ crystallization and seeding method, and the liquid phase transport method.

The term "$C_n$" hydrocarbon wherein n is an positive integer, e.g., 1, 2, 3, 4, 5, 6, 7, 8, 9, 10, 11, 12, as used herein means a hydrocarbon having n number of carbon atom(s) per molecular. For example, $C_n$ aromatics means an aromatic hydrocarbon having n number of carbon atom(s) per molecular. The term "$C_n+$" hydrocarbon wherein n is an positive integer, e.g., 1, 2, 3, 4, 5, 6, 7, 8, 9, 10, 11, 12, as used herein means a hydrocarbon having at least n number of carbon atom(s) per molecular. The term "$C_n-$" hydrocarbon wherein n is an positive integer, e.g., 1, 2, 3, 4, 5, 6, 7, 8, 9, 10, 11, 12, as used herein means a hydrocarbon having no more than n number of carbon atom(s) per molecular.

The term "$C_n$ feedstock", wherein n is a positive integer, e.g., 1, 2, 3, 4, 5, 6, 7, 8, 9, 10, 11, 12, as used herein, means that the $C_n$ feedstock comprises greater than 50 wt. % of hydrocarbons having n number of carbon atom(s) per molecule. The term "$C_n+$ feedstock", wherein n is a positive integer, e.g., 1, 2, 3, 4, 5, 6, 7, 8, 9, 10, 11, 12, as used herein, means that the $C_n+$ feedstock comprises greater than 50 wt. % of hydrocarbons having at least n number of carbon atom(s) per molecule. The term "$C_n-$ feedstock" wherein n is a positive integer, e.g., 1, 2, 3, 4, 5, 6, 7, 8, 9, 10, 11, 12, as used herein, means that the $C_n-$ feedstock comprises greater than 50 wt. % of hydrocarbons having no more than n number of carbon atom(s) per molecule. The term "$C_n$ aromatic feedstock", wherein n is a positive integer, e.g., 1, 2, 3, 4, 5, 6, 7, 8, 9, 10, 11, 12, as used herein, means that the $C_n$ aromatic feedstock comprises greater than 50 wt. % of aromatic hydrocarbons having n number of carbon atom(s) per molecule. The term "$C_n+$ aromatic feedstock", wherein n is a positive integer, e.g., 1, 2, 3, 4, 5, 6, 7, 8, 9, 10, 11, 12, as used herein, means that the $C_n+$ aromatic feedstock comprises greater than 50 wt. % of aromatic hydrocarbons having at least n number of carbon atom(s) per molecule. The term "$C_n-$ aromatic feedstock" wherein n is a positive integer, e.g., 1, 2, 3, 4, 5, 6, 7, 8, 9, 10, 11, 12, as used herein, means that the $C_n-$ aromatic feedstock comprises greater than 50 wt. % of aromatic hydrocarbons having no more than n number of carbon atom(s) per molecule.

In some embodiments of this disclosure, the regeneration process is useful for regenerating a catalyst composition having a molecular sieve, wherein the molecular sieve comprises at least one of a M41S family molecular sieve, a MCM-22 family molecular sieve, ETS-10, ETAS-10, ETGS-10, and a molecular sieve having a zeolite framework type comprising at least one of ABW, AET, AFG, AFI, AFX, ANA, AST, ASV, BCT, *BEA, BEC, BIK, BOG, BPH, BRE, CAN, CAS, CDO, CFI, CGS, CHA, -CHI, CON, DAC, DDR, DFT, DOH, DON, EAB, EDI, EMT, EON, EPI, ERI, ESV, ETR, EUO, EZT, FAR, FAU, FER, FRA, GIS, GIU, GME, GON, GOO, HEU, IFR, IHW, IMF, ISV, ITE, ITH, ITW, IWR, IWV, IWW, JBW, KFI, LAU, LEV, LIO, -LIT, LOS, LOV, LTA, LTL, LTN, MAR, MAZ, MEI, MEL, MEP, MER, MFI, MFS, MON, MOR, MOZ, MSE, MSO, MTF, MTN, MTT, MTW, MWW, NAB, NAT, NES, NON, NPO, NSI, OBW, OFF, OSO, OWE, -PAR, PAU, PHI, PON, RHO, -RON, RRO, RSN, RTE, RTH, RUT, RWR, RWY, SFE, SFF, SFG, SFH, SFN, SFO, SGT, SIV, SOD, SOS, SSY, STF, STI, STT, SZR, TER, THO, TOL, TON, TSC, TUN, UEI, UFI, UOZ, USI, UTL, VET, VNI, VSV, -WEN, and YUG. In a preferred embodiment, the molecular sieve useful in this disclosure comprises at least one of Mordenite, ZSM-12, MCM-22 family material, ZSM-5, ZSM-11, ZSM-22, ZSM-23, zeolite beta, and zeolite Y. The composition of this disclosure may further comprise a binder. In further embodiments of this disclosure, the composition of this disclosure may also comprise at least one metal selected from Groups 1-17, preferably Groups 3-12, more preferably Groups 6-10, of the Periodic Table of Element.

The binders which are used in preparing the catalyst compositions include clays, silica, alumina, and mixtures thereof. Specific examples of clays include attapulgite, bentonite, sepiolite, halloysite, and kaolinite. The zeolite and binder can be combined in various ratios but usually the binder is present from 10 to 90 wt. % of the catalyst composition.

The catalyst composition can be formed into various shapes by means well known in the art. Generally the molecular sieve and binder are combined along with water and optionally one or more additives selected from extrusion aids, dispersion aids, porosity modifiers, peptizing agents, etc. Examples of these additives are carboxymethylcellulose (extrusion aid), sodium salt of polyacrylic acid (dispersion aid), polyethylene (porosity modifier), nitric acid (peptizing agent). The molecular sieve, water and optional additive are homogeneously mixed by mulling, kneading, etc. Once a homogeneous mixture is obtained it is formed into shapes such as extrudates, pellets, pills, beads, etc., by means well known in the art. These shaped catalyst compositions will possess the physical and chemical properties necessary for the intended use. For example, crush strength, attrition resistance, surface area, adsorption capacity, etc.

These catalyst compositions are used in various hydrocarbon conversion processes, such as toluene disproportionation, transalkylation, alkylation, catalytic cracking, and/or polymerization processes. During the hydrocarbon conversion process, the catalyst composition may be deactivated due to coke deposition.

The spent catalyst compositions are regenerated according to the process of this disclosure, wherein the catalyst composition comprises a molecular sieve and at least 10 wt. % coke having a C/H molar ratio in the range of 0.26 to 5, the process comprising:
  a. contacting the catalyst composition with a first oxidative medium having oxygen and water at first conditions sufficient to form a first regenerated catalyst composition having at least 50 wt. % less coke than the catalyst composition; and then
  b. contacting at least a portion of the first regenerated catalyst composition with a second oxidative medium having oxygen, and optionally water, at second conditions sufficient to form a second regenerated catalyst composition having at least 50 wt % less coke than the first regenerated catalyst composition, wherein the catalyst composition in step (a) and the first regenerated catalyst composition in step (b) have contacted a total amount of water in the range of 1 to 50, weight water per weight of the second regenerated catalyst composition.

In some aspects of this disclosure, the molecular sieve comprises at least one of a M41S family molecular sieve, a MCM-22 family molecular sieve, ETS-10, ETAS-10, ETGS-10, and a molecular sieve having a zeolite framework type comprising at least one of ABW, AET, AFG, AFI, AFX, ANA, AST, ASV, BCT, *BEA, BEC, BIK, BOG, BPH, BRE, CAN, CAS, CDO, CFI, CGS, CHA, -CHI, CON, DAC, DDR, DFT, DOH, DON, EAB, EDI, EMT, EON, EPI, ERI, ESV, ETR, EUO, EZT, FAR, FAU, FER, FRA, GIS, GIU, GME, GON, GOO, HEU, IFR, IHW, IMF, ISV, ITE, ITH, ITW, IWR, IWV, IWW, JBW, KFI, LAU, LEV, LIO, -LIT, LOS, LOV, LTA, LTL, LTN, MAR, MAZ, MEI, MEL, MEP, MER, MFI, MFS, MON, MOR, MOZ, MSE, MSO, MTF, MTN, MTT, MTW, MWW, NAB, NAT, NES, NON, NPO, NSI, OBW, OFF, OSO, OWE, -PAR, PAU, PHI, PON, RHO, -RON, RRO, RSN, RTE, RTH, RUT, RWR, RWY, SFE, SFF, SFG, SFH, SFN, SFO, SGT, SIV, SOD, SOS, SSY, STF, STI, STT, SZR, TER, THO, TOL, TON, TSC, TUN, UEI, UFI, UOZ, USI, UTL, VET, VNI, VSV, -WEN, and YUG.

The regenerated catalyst composition is useful as a catalyst composition in a wide range of processes, including separation processes and hydrocarbon conversion processes. Specific examples of hydrocarbon conversion processes which are effectively catalyzed by the crystalline molecular sieve(s) of this disclosure by itself or in combination with one or more other catalytically active substances including other crystalline molecular sieves, include the following:
  (i) alkylation of aromatic hydrocarbons, e.g., benzene, with long chain olefins, e.g., $C_{14}$ olefin, with reaction conditions including, individually or in any combination, a temperature of from 340° C. to 500° C., a pressure of from 101 to 20200 kPa-a (absolute), a weight hourly space velocity of from 2 $hr^{-1}$ to 2000 $hr^{-1}$ and an aromatic hydrocarbon/olefin mole ratio of from 1/1 to 20/1, to provide long chain alkyl aromatics which can be subsequently sulfonated to provide synthetic detergents;
  (ii) alkylation of aromatic hydrocarbons with gaseous olefins to provide short chain alkyl aromatic compounds, e.g., the alkylation of benzene with propylene to provide cumene, with reaction conditions including, individually or in any combination, a temperature of from 10° C. to 125° C., a pressure of from 101 to 3030 kPa-a, and an aromatic hydrocarbon weight hourly space velocity (WHSV) of from 5 $hr^{-1}$ to 50 $hr^{-1}$;
  (iii) alkylation of reformat containing substantial quantities of benzene and toluene with fuel gas containing $C_5$ olefins to provide, inter alia, mono- and di-alkylates with reaction conditions including, individually or in any combination, a temperature of from 315° C. to 455° C., a pressure of from 3000 to 6000 kPa-a, a WHSV-olefin of from 0.4 $hr^{-1}$ to 0.8 $hr^{-1}$, a WHSV-reformate of from 1 $hr^{-1}$ to 2 $hr^{-1}$ and a gas recycle of from 1.5 to 2.5 vol/vol fuel gas feed;
  (iv) alkylation of aromatic hydrocarbons, e.g., benzene, toluene, xylene and naphthalene, with long chain olefins, e.g., $C_{14}$ olefin, to provide alkylated aromatic lube base stocks with reaction conditions including, individually or in any combination, a temperature of from 160° C. to 260° C. and a pressure of from 2600 to 3500 kPa-a;
  (v) alkylation of phenols with olefins or equivalent alcohols to provide long chain alkyl phenols with reaction conditions including, individually or in any combination, a temperature of from 200° C. to 250° C., a pressure of from 1500 to 2300 kPa-a and a total WHSV of from 2 $hr^{-1}$ to 10 $hr^{-1}$;
  (vi) conversion of light paraffins to olefins and aromatics with reaction conditions including, individually or in any combination, a temperature of from 425° C. to 760° C. and a pressure of from 170 to 15000 kPa-a;
  (vii) conversion of light olefins to gasoline, distillate and lube range hydrocarbons with reaction conditions including, individually or in any combination, a temperature of from 175° C. to 375° C. and a pressure of from 800 to 15000 kPa-a;
  (viii) two-stage hydrocracking for upgrading hydrocarbon streams having initial boiling points above 260° C. to premium distillate and gasoline boiling range products in a first stage using the MCM-22 family molecular sieve of this disclosure in combination with a Groups 8-10 metal as a catalyst composition with effluent therefrom being reaction in a second stage using zeolite Beta, also in combination with a Groups 8-10 metal, as a catalyst composition, the reaction conditions including, individually or in any combination, a temperature of from 340° C. to 455° C., a pressure of from 3000 to 18000 kPa-a, a hydrogen circulation of from 176 to 1760 liter/liter and a liquid hourly space velocity (LHSV) of from 0.1 to 10 $h^{-1}$;
  (ix) a combination hydrocracking/dewaxing process in the presence of the MCM-22 family molecular sieve of this disclosure and a hydrogenation component as a catalyst composition, or a mixture of such catalyst composition and zeolite Beta, with reaction conditions including, individually or in any combination, a temperature of from 350° C. to 400° C., a pressure of from 10000 to 11000 kPa-a, an LHSV of from 0.4 to 0.6 and a hydrogen circulation of from 528 to 880 liter/liter;
  (x) reaction of alcohols with olefins to provide mixed ethers, e.g., the reaction of methanol with isobutene and/or isopentene to provide methyl-t-butyl ether (MTBE) and/or t-amyl methyl ether (TAM) with conversion conditions including, individually or in any combination, a temperature of from 20° C. to 200° C., a pressure of from 200 to 20000 kPa-a, a WHSV (gram-olefin per hour gram-zeolite) of from 0.1 $hr^{-1}$ to 200 $hr^{-1}$ and an alcohol to olefin molar feed ratio of from 0.1/1 to 5/1;
  (xi) toluene disproportionation with $C_9$+ aromatics as co-feed with reaction conditions including, individually or in any combination, a temperature of from 315° C. to 595° C., a pressure of from 101 to 7200 kPa-a, a hydrogen/hydrocarbon mole ratio of from 0 (no added hydrogen) to 10 and a WHSV of from 0.1 hr$^{-1}$ to 30 hr$^{-1}$;

(xii) preparation of the pharmaceutically-active compound 2-(4-isobutylphenyl) propionic acid, i.e. ibuprofen, by reacting isobutyl benzene with propylene oxide to provide the intermediumte 2-(4-isobutylphenyl) propanol followed by oxidation of the alcohol to the corresponding carboxylic acid;

(xiii) use as an acid-binding agent in the reaction of amines with heterocyclic fiber-reactive components in preparation of dyes to prepare practically salt-free reactive dye-containing solution, as in German Patent No. DE 3,625,693;

(xiv) as the absorbent for separating 2,6-toluene diisocyanate (2,6-TDI) from isomers if TDI as in U.S. Pat. No. 4,721,807, whereby a feed mixture comprising 2,6-TDI and 2,4-TDI is contacted with the present MCM-22 family molecular sieve which has been cation-exchanged with K ions to absorb the 2,6-TDI, followed by recovering the 2,6-TDI by desorption with desorbent material comprising toluene;

(xv) as the absorbent for separating 2,4-TDI from its isomers as in U.S. Pat. No. 4,721,806, whereby a feed mixture comprising 2,4-TDI and 2,6-TDI is contacted with the present MCM-22 family molecular sieve which has been cation-exchanged with Na, Ca Li and/or Mg ions to absorb the 2,4-TDI, followed by recovering the 2,4-TDI by desorption with desorbent material comprising toluene;

(xvi) in a process for decreasing the durene content of a 90-200° C.+ bottoms fraction obtained from the catalytic conversion of methanol to gasoline which comprises contacting the durene-containing bottoms fraction with hydrogen over a catalyst composition of the present MCM-22 family molecular sieve with a hydrogenation metal, at conditions including, individually or in any combination, a temperature of from 230° C. to 425° C. and a pressure of from 457 to 22000 kPa-a;

(xvii) in a processes for co-producing phenol and ketones that proceed through benzene alkylation, followed by formation of the alkylbenzene hydroperoxide and cleavage of the alkylbenzene hydroperoxide into phenol and ketone, e.g., benzene and propylene to phenol and acetone, benzene and $C_4$ olefins to phenol and methyl ethyl ketone, such as those described for example in International Application No. PCT/EP2005/008557, which can be followed by conversion of phenol and acetone to bis-phenol-A as described in International Application No. PCT/EP2005/008554, benzene to phenol and cyclohexanone, or benzene and ethylene to phenol and methyl ethyl ketone, as described for example in International Application No. PCT/EP2005/008551;

(xviii) in a process of benzene alkylation reactions where selectivity to the monoalkylbenzene is required, e.g., selectively sec-butylbenzene from benzene and $C_4$ olefin feeds that are rich in linear butenes, as described in International Application No. PCT/EP2005/008557, preferably, this conversion is carried out by co-feeding benzene and the $C_4$ olefin feed with the catalyst composition of the present invention, at a temperature of 60° C. to 260° C., for example of 100° C. to 200° C., a pressure of 7000 kPa-a or less, and a feed weight hourly space velocity (WHSV) based on $C_4$ alkylating agent of from 0.1 to 50 h$^{-1}$ and a molar ratio of benzene to $C_4$ alkylating agent from 1 to 50; and (xix) in a process for transalkylations, such as, contacting a feed comprising $C_9$+ aromatic hydrocarbons and toluene under transalkylation reaction conditions with a first catalyst composition comprising a zeolite having a constraint index ranging from 0.5 to 3, such as ZSM-12, and a hydrogenation component and the effluent resulting from the first contacting step is then contacted with a second catalyst composition which comprises a zeolite having a constraint index ranging from 3 to 12, such as ZSM-5, and which may be in a separate bed or a separate reactor from the first catalyst composition to produce a transalkylation reaction product comprising benzene and xylene.

The transalkylation process uses $C_6$-$C_7$ and $C_9$+ aromatics as fresh feeds to the unit to produce $C_8$ aromatics. The $C_6$-$C_7$ feed for a transalkylation process may contain up to 95 wt. % of non-aromatics, which may vary in type from straight chain paraffins to naphthenes. The $C_6$-$C_7$ stream is generally processed in an extraction unit to remove the non-aromatics prior to being used in a transalkylation unit. In some cases, the extraction unit can be bypassed such that an unextracted $C_6$-$C_7$ portion is sent directly to the transalkylation unit. The unextracted $C_6$-$C_7$ feed may contain from 10 to 67 wt. % $C_6$ non-aromatics and/or from 6 to 38 wt. % $C_7$ non-aromatics. Some of the non-aromatics may be removed in the transalkylation unit via reactions such as cracking to lighter olefins, and subsequently saturated or alkylated with another species to form heavier molecules, or purged in downstream recovery section. The extent of the conversion depends on the type of species. Straight chain paraffins will likely react more readily than naphthenes. The unreacted non-aromatics in the $C_6$-$C_7$ feed will be recycled until extinction. Therefore, some buildup of the amount of non-aromatics in the total liquid feed to the reactor is expected, and such amount depends on the types of non-aromatics in the fresh $C_6$-$C_7$ feed.

EXAMPLE 1

Comparative

A spent catalyst composition having 50 wt. % coke with C/H=3.3, 65 wt. % ZSM-12, and 35 wt. % alumina binder. The spent catalyst composition was loaded into a fixed bed reactor located in an isothermal furnace. The regeneration conditions used during the main burn were as follows:

| | |
|---|---|
| Average Reactor Temperature | 396° C. |
| Reactor Pressure | 448 kPa-a |
| Gas Flow | 0.6 Nm$^3$/hr/kg cat |
| Inlet O$_2$ Concentration | 0.84% |
| Inlet Gas H$_2$O Partial Pressure | 0.0 kPa-a |
| Duration | 18 days |
| Total Water Exposure | 0.0 weight H$_2$O/weight catalyst |

The oxygen concentration at the exit of the reactor was monitored using an oxygen analyzer. When the conversion of oxygen dropped below 10 wt. %, a clean-up burn was used to remove any residual coke remaining on the catalyst composition. The conditions of the clean-up burn were as follows:

| | |
|---|---|
| Average Reactor Temperature | 430° C. |
| Reactor Pressure | 448 kPa-a |
| Gas Flow | 0.6 Nm$^3$/hr/kg cat |
| Inlet O$_2$ Concentration | 7.0% |
| Inlet Gas H$_2$O Partial Pressure | 0.0 kPa-a |
| Duration | 6 hours |

Following regeneration of the catalyst composition, the catalytic activity for transalkylation of heavy aromatics was tested in a fixed-bed microunit. The reactor pressure was 2529 kPa-a and the H$_2$:HC ratio was 2:1. The feed to the reactor contained 85 wt. % heavy aromatics and 15 wt. % benzene+ toluene. A detailed analysis of the feed is shown in Table 1. The catalyst composition was initially reduced in hydrogen at 427° C., then sulfided with 7 molar equivalents of $H_2S$ per mole of platinum, prior to the introduction of feed. The reactor temperature was set to maintain an overall $C_9+C_{10}$ conversion of ~57.5±0.5 wt. %. The total feed flowrate, expressed as grams feed per gram catalyst composition per hour (WHSV) was 3 $hr^{-1}$. The product was analyzed using on-line GC-FID. The aging rate, expressed as the rate of increase in temperature required to maintain constant $C_9+C_{10}$ conversion, for the catalyst composition regenerated under dry conditions was 73° C./month.

TABLE 1

| Component | Composition (wt. %) |
| --- | --- |
| Benzene | 8.6 |
| Toluene | 6.4 |
| Xylene | 0.25 |
| Propyl benzene | 3.1 |
| Ethyltoluene | 27.0 |
| Trimethylbenzene | 46.0 |
| Indane | 1.0 |
| Propyltoluene | 3.1 |
| Diethylbenzene | 2.1 |
| Ethylxylene | 12.4 |
| Tetramethylbenzene | 2.9 |
| $C_{11+}$ Aromatics | 0.4 |
| Non-aromatics | 1.0 |

EXAMPLE 2

A spent catalyst composition having 50 wt. % coke with C/H=3.3, 65 wt. % ZSM-12, and 35 wt. % alumina binder. The spent catalyst composition was loaded into a fixed bed reactor located in an isothermal furnace. The regeneration conditions used during the main burn were as follows:

| | |
| --- | --- |
| Average Reactor Temperature | 385-396° C. |
| Reactor Pressure | 448 kPa-a |
| Gas Flow | 0.6 $Nm^3$/hr/kg cat |
| Inlet $O_2$ Concentration | 0.84% |
| Inlet Gas $H_2O$ Partial Pressure | 6.24 kPa-a |
| Duration | 15 days |
| Total Water Exposure | 2.0 weight $H_2O$/weight catalyst |

The oxygen concentration at the exit of the reactor was monitored using an oxygen analyzer. When the conversion of oxygen dropped below 10 wt. %, a clean-up burn was used to remove any residual coke remaining on the catalyst composition. The conditions of the clean-up burn were as follows:

| | |
| --- | --- |
| Average Reactor Temperature | 430° C. |
| Reactor Pressure | 448 kPa-a |
| Gas Flow | 0.6 $Nm^3$/hr/kg cat |
| Inlet $O_2$ Concentration | 7.0 wt. % |
| Inlet Gas $H_2O$ Partial Pressure | 0.0 kPa-a |
| Duration | 6 hours |

Following regeneration of the catalyst composition, the catalytic activity for transalkylation of heavy aromatics was tested in a fixed-bed microunit using the same testing protocol as described in Example 1. The aging rate, expressed as the rate of increase in temperature required to maintain constant $C_9+C_{10}$ conversion, for the catalyst composition regenerated under conditions of 6.24 kPa-a $H_2O$ partial pressure during the main burn was 31° C./month. As indicated by this example, the presence of a small amount of water during the main burn reduced the aging rate by a factor of 2. In addition, the presence of water reduced the burn time required for the main burn by ~3 days.

EXAMPLE 3

A spent catalyst composition having 50 wt. % coke with C/H=3.3, 65 wt. % ZSM-12, and 35 wt. % alumina binder. The spent catalyst composition was loaded into a fixed bed reactor located in an isothermal furnace. The regeneration conditions used during the main burn were as follows:

| | |
| --- | --- |
| Average Reactor Temperature | 385-396° C. |
| Reactor Pressure | 448 kPa-a |
| Gas Flow | 0.6 $Nm^3$/hr/kg cat |
| Inlet $O_2$ Concentration | 0.80% |
| Inlet Gas $H_2O$ Partial Pressure | 34.7 kPa-a |
| Duration | 14 days |
| Total Water Exposure | 12.6 weight $H_2O$/weight catalyst |

The oxygen concentration at the exit of the reactor was monitored using an oxygen analyzer. When the conversion of oxygen dropped below 10 wt. %, a clean-up burn was used to remove any residual coke remaining on the catalyst composition. The conditions of the clean-up burn were as follows:

| | |
| --- | --- |
| Average Reactor Temperature | 430° C. |
| Reactor Pressure | 448 kPa-a |
| Gas Flow | 0.6 $Nm^3$/hr/kg cat |
| Inlet $O_2$ Concentration | 7.0 wt. % |
| Inlet Gas $H_2O$ Partial Pressure | 34.7 kPa-a |
| Duration | 6 hours |
| Total Water Exposure | 0.2 weight $H_2O$/weight catalyst |

Following regeneration of the catalyst composition, the catalytic activity for transalkylation of heavy aromatics was tested in a fixed-bed microunit using the same testing protocol as described in Example 1. The aging rate, expressed as the rate of increase in temperature required to maintain constant $C_9+C_{10}$ conversion, for the catalyst composition regenerated under conditions of 34.7 kPa-a $H_2O$ partial pressure was 12° C./month. As indicated by this example, a water partial pressure of 34.7 kPa-a reduced the aging rate by a factor of ~6. In addition, the duration of the main burn was shorter by an additional day.

As illustrated by Example 2 and Example 3, the presence of water increases the rate of coke removal, thereby shortening the regeneration time. In addition, the performance of the catalyst composition improves, with second cycle aging rates decreasing with increased water exposure during regeneration. As a further benefit, the use of water during regeneration facilitates the removal of some contaminants, e.g. chlorides, from the catalyst composition that tend to accumulate on the catalyst composition during regular service.

All patents, patent applications, test procedures, priority documents, articles, publications, manuals, and other documents cited herein are fully incorporated by reference for all jurisdictions in which such incorporation is permitted.

When numerical lower limits and numerical upper limits are listed herein, ranges from any lower limit to any upper limit are contemplated.

While the illustrative embodiments of the invention have been described with particularity, it will be understood that various other modifications will be apparent to and may be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

What is claimed is:

1. A process for regenerating a catalyst composition, wherein said catalyst composition comprises a molecular sieve and at least 10 wt. % coke having a C/H molar ratio in the range of 0.26 to 5, said process comprising:
(a) contacting said catalyst composition with a first oxidative medium having oxygen and water in a reactor at first conditions sufficient to form a first regenerated catalyst composition having at least 50 wt. % less coke than said catalyst composition; and
(b) monitoring the oxygen concentration at an exit of said reactor, and when said oxygen concentration drops below 10% of the oxygen concentration at said first conditions, then
(c) contacting at least a portion of said first regenerated catalyst composition with a second oxidative medium having oxygen at second conditions sufficient to form a second regenerated catalyst composition having at least 50 wt. % less coke than said first regenerated catalyst composition,
wherein said catalyst composition in step (a) and said first regenerated catalyst composition in step (b) have contacted a total amount of water in the range of 1 to 50 weight water per weight of said second regenerated catalyst composition.

2. The process of claim 1, wherein said molecular sieve comprises at least one of a M41S family molecular sieve, a MCM-22 family molecular sieve, ETS-10, ETAS-10, ETGS-10, and a molecular sieve having a zeolite framework type comprising at least one of ABW, AET, AFG, AFI, AFX, ANA, AST, ASV, BCT, *BEA, BEC, BIK, BOG, BPH, BRE, CAN, CAS, CDO, CFI, CGS, CHA, -CHI, CON, DAC, DDR, DFT, DOH, DON, EAB, EDI, EMT, EON, EPI, ERI, ESV, ETR, EUO, EZT, FAR, FAU, FER, FRA, GIS, GIU, GME, GON, GOO, HEU, IFR, IHW, IMF, ISV, ITE, ITH, ITW, IWR, IWV, IWW, JBW, KFI, LAU, LEV, LIO, -LIT, LOS, LOV, LTA, LTL, LTN, MAR, MAZ, MEI, MEL, MEP, MER, MFI, MFS, MON, MOR, MOZ, MSE, MSO, MTF, MTN, MTT, MTW, MWW, NAB, NAT, NES, NON, NPO, NSI, OBW, OFF, OSO, OWE, -PAR, PAU, PHI, PON, RHO, -RON, RRO, RSN, RTE, RTH, RUT, RWR, RWY, SFE, SFF, SFG, SFH, SFN, SFO, SGT, SIV, SOD, SOS, SSY, STF, STI, STT, SZR, TER, THO, TOL, TON, TSC, TUN, UEI, UFI, UOZ, USI, UTL, VET, VNI, VSV, -WEN, and YUG.

3. The process of claim 2, wherein said molecular sieve comprises at least one of a molecular sieve having a zeolite framework type comprising at least one of *BEA, BOG, CAN, CHA, CON, EMT, EUO, FAU, FER, LEV, LTA, LTL, MAR, MAZ, MEI, MEL, MFI, MFS, MOR, MTW, MWW, RHO, SOD, and TON.

4. The process of claim 1, wherein said coke has a C/H molar ratio in the range of 0.5 to 2 and wherein said catalyst composition in step (a) and said first regenerated catalyst composition in step (b) have contacted a total amount of water in the range of 1 to 20 weight water per weight of said second regenerated catalyst composition.

5. The process of claim 1, wherein said coke has a C/H molar ratio in the range of 1.5 to 3.3 and wherein said catalyst composition in step (a) and said first regenerated catalyst composition in step (b) have contacted a total amount of water in the range of 10 to 50 weight water per weight of said second regenerated catalyst composition.

6. The process of claim 1, wherein said catalyst composition comprises 20-50 wt. % coke and said catalyst composition comprises at least 50 wt. % of a molecular sieve having a zeolite structure type of MTW based on the total weight of said catalyst composition without coke.

7. The process of claim 1, wherein said catalyst composition further comprises 0.01 to 10 wt. % of at least one of a metal element of Groups 6-10 based on the total weight of said catalyst composition without coke.

8. The process of claim 7, wherein said metal element is at least one of Pt, Re, Ir, and Pd.

9. The process of claim 1, wherein said first conditions comprise a temperature in the range of 250 to 425° C., a pressure in the range of 100 to 2070 kPa-a, a gas flowrate in the range of 0.1 to 10 $Nm^3$/hr/kg catalyst composition, and a water partial pressure in the range of 7 to 207 kPa-a.

10. The process of claim 9, wherein said first conditions further comprise a regeneration time sufficient to reduce the amount of said coke on said catalyst composition by at least 80 wt. %.

11. The process of claim 1, wherein said second conditions comprise a temperature in the range of 350 to 500° C., a pressure in the range of 100 to 2070 kPa-a, a gas flowrate in the range of 0.1 to 10 $Nm^3$/hr/kg catalyst composition, and a water partial pressure in the range of 3 to 35 kPa-a.

12. The process of claim 11, wherein said second conditions further comprise a regeneration time sufficient to reduce the amount of said coke on said first regenerated catalyst composition by at least 80 wt. %.

13. The process of claim 5, wherein said second regenerated catalyst composition has a transalkylation activity in the range of 70% to 120% of a corresponding fresh catalyst composition, wherein said transalkylation activity is measured by determining the conversion of $C_9$ and $C_{10}$ aromatic hydrocarbons under transalkylating conditions with $C_6$ and $C_7$ aromatic hydrocarbons, where typical transalkylating conditions include a temperature in the range of 375 to 500° C., pressure in the range of 1500 kPa-a to 3500 kPa-a, WHSV in the range of 2 to 20 and a $H_2$:HC ratio in the range of 1 to 10.

14. The process of claim 5, wherein said second regenerated catalyst composition has a transalkylation aging rate in the range of 60% to 110% of a corresponding fresh catalyst composition, wherein said transalkylation aging rate is measured by determining the rate of temperature increase required to maintain constant conversion of $C_9$ and $C_{10}$ aromatic hydrocarbons under transalkylating conditions with $C_6$ and $C_7$ aromatic hydrocarbons, where typical transalkylating conditions include a temperature in the range of 375 to 475° C., pressure in the range of 2000 kPa-a to 3000 kPa-a, WHSV in the range of 2 to 10 and a $H_2$:HC ratio in the range of 1 to 8.

15. The process of claim 1, wherein said second oxidative medium of contacting step (c) comprising oxygen and water.

* * * * *